United States Patent [19]

Loucks

[11] Patent Number: 4,701,018

[45] Date of Patent: Oct. 20, 1987

[54] APPARATUS FOR MOUNTING TWO LASERS TO PRODUCE PARALLEL OR COLINEAR BEAMS

[75] Inventor: Bryan E. Loucks, Los Altos Hills, Calif.

[73] Assignee: Greyhawk Systems, Inc., Milpitas, Calif.

[21] Appl. No.: 914,642

[22] Filed: Oct. 2, 1986

[51] Int. Cl.⁴ .............................................. G02B 27/10
[52] U.S. Cl. ................................... 350/174; 356/153; 362/250; 350/321
[58] Field of Search ............... 350/174, 321, 287, 602, 350/632, 634, 636; 356/153; 219/121 LS, 121 LU; 372/109; 362/418, 259, 250

[56] References Cited

U.S. PATENT DOCUMENTS 4,650,298  3/1987  Katoh et al. ........................ 350/602

Primary Examiner—Jon W. Henry
Attorney, Agent, or Firm—Flehr, Hohbach, Test, Albritton & Herbert

[57] ABSTRACT

A simply structured apparatus for mounting two lasers to produce controlled mutual parallelism or colinearity of the beams by simple operations comprises a frame with mutually perpendicular walls to which two laser-amounting plates are individually affixed. Two adjusting screws are provided for controllably aiming lasers individually by causing their supporting plates to flex in mutually perpendicular directions.

3 Claims, 1 Drawing Figure

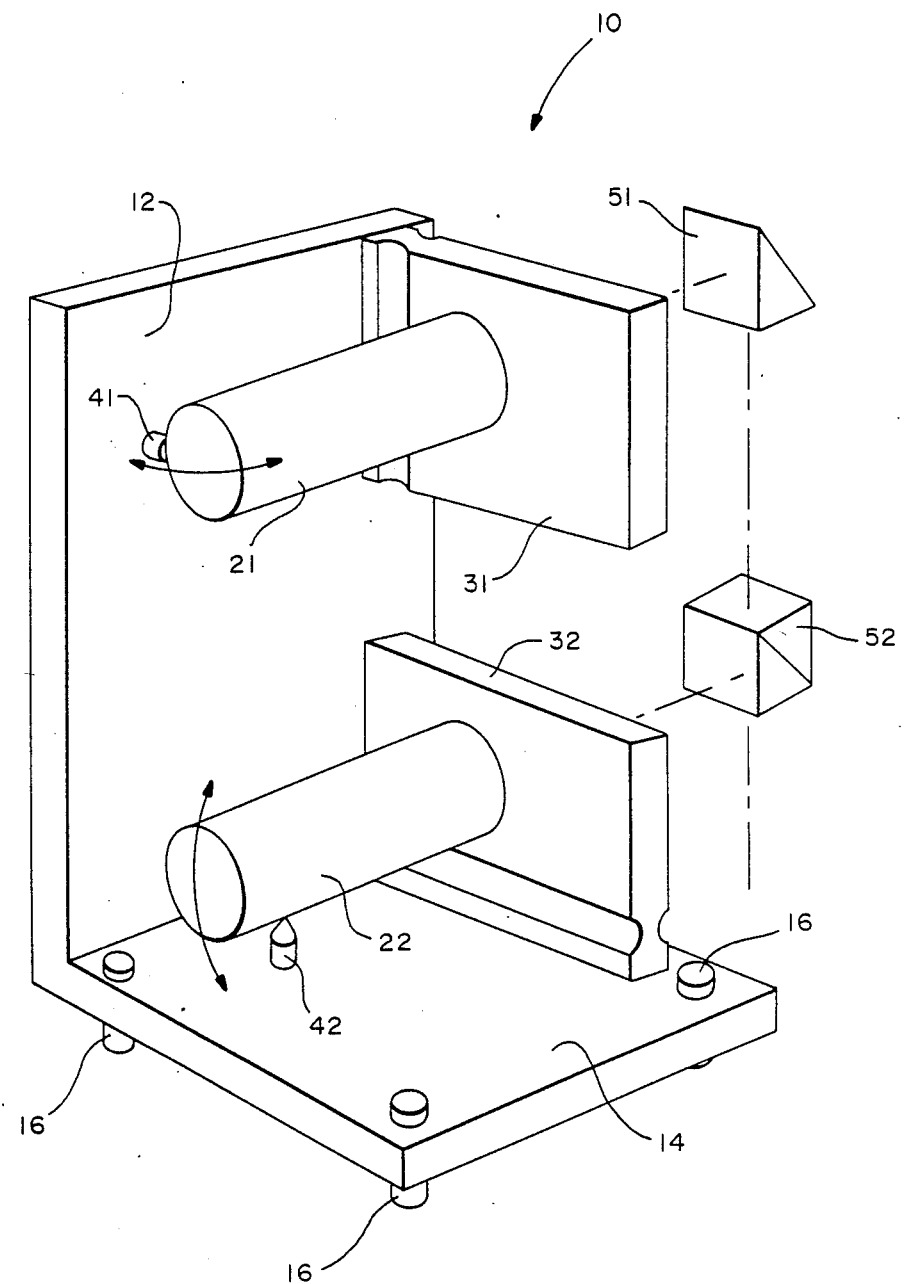
FIG.—1

APPARATUS FOR MOUNTING TWO LASERS TO PRODUCE PARALLEL OR COLINEAR BEAMS

BACKGROUND OF THE INVENTION

This invention relates to an apparatus for mounting two lasers and more particularly to an apparatus of a simple structure for mounting two lasers such that they can be adjusted by simple operations to produce mutually parallel or colinear beams in a desired direction. In addition, two beams may be controlled to essentially any desired degree of parallelism.

In connection with an optical image projection system utilizing a thermally-addressed liquid crystal cell as reviewed in an article entitled "Laser-Addressed Liquid Crystal Displays" by A. G. Dewey (Optical Engineering, May/June 1984), for example, there are situations where it is desired to have two laser beams from two separate sources in a mutually parallel relationship or to make them coaxial as precisely as desired. By the use of a prism to deflect a beam by 90° and of a beam combiner to form coaxial beams out of two beams originally travelling in mutually perpendicular directions, the aforementioned object can be accomplished by providing an apparatus for mounting two lasers so that their beams are as exactly parallel to each other as desired.

SUMMARY OF THE INVENTION

It is an object of the present invention to provide a simple apparatus for mounting two lasers in a controlled degree of parallelism with respect to each other.

It is another object of the present invention to provide an apparatus by which two lasers mounted thereto can be adjusted by simple operations to produce mutually parallel or colinear beams.

The above and other objects of the present invention can be achieved by providing a frame with two mutually perpendicular surfaces to which are individually attached two laser-supporting plates such that they can flex in mutually perpendicular directions. Two adjusting screws individually normal to the two frame surfaces are provided to adjustingly move the lasers individually affixed to the plates.

BRIEF DESCRIPTION OF THE DRAWING

The accompanying schematic drawing, which is incorporated in and forms a part of the specification, is a diagonal view of an apparatus for mounting two lasers to produce mutually parallel or coaxial beams. Together with the following detailed description, it serves to explain the principles of the invention.

DETAILED DESCRIPTION OF THE INVENTION

The accompanying FIGURE shows a dual laser mounting apparatus 10 embodying the present invention. It comprises a frame with a generally L-shaped cross section, having a vertical wall 12 and a horizontal wall 14 which are so called for convenience of reference but need not necessarily be exactly horizontal or vertical. These walls 14 and 16 have surfaces which are nominally 90° with respect to each other. The horizontal wall 14 is provided with three-point mounting means 16 of any well known kind so that the overall orientation of the apparatus 10 can be controllably varied.

Two lasers 21 and 22 are horizontally mounted perpendicularly to a first mounting plate 31 and a second mounting plate 32, respectively, which are both elastic and vertically oriented. The first plate 31 is attached along a vertical edge thereof to the vertical wall 12 and the second plate 32 is attached along a horizontal edge thereof to the horizontal wall 14 such that the two plates 31 and 32 are nearly coplanar. A horizontal screw 41 is provided to the vertical wall 12 as shown such that the laser 21 can be displaced against or along the restorative elastic force of the first plate 31 to move it in a horizontal plane as indicated by horizontal arrows by turning this screw 41 in one direction or the other, thereby causing the first mounting plate 31 to flex around its vertical edge along which it is attached to the vertical wall 12. Likewise, a vertical screw 42 is provided to the horizontal wall 14 as shown such that the laser 22 can be displaced against or along the restorative elastic force of the second plate 32 and be moved in a vertical plane as indicated by vertical arrows by turning this screw 42 in one direction or the other, thereby causing the second plate 32 to flex around its horizontal bottom edge along which it is attached to the horizontal wall 14.

With this apparatus 10, the beams from the two lasers 21 and 22 can be made parallel within a few seconds of arc by adjusting the screws 41 and 42. By using an optical system with a prism 51 for reflecting an incident beam by 90° and a beam combiner 52 of a known kind which can pass and reflect beams of light incident at 90° with respect to each other, the beams from the lasers 21 and 22 can be made colinear as well. After a parallel or colinear relationship is thus established between the beams, the three-point mounting means 16 are adjusted such that the parallel or colinear beams from the lasers 21 and 22 are pointed in a desired direction.

The foregoing description of a preferred embodiment of the invention has been presented for purposes of illustration and description. It is not intended to be exhaustive or to limit the invention to the precise form disclosed, and many modifications and variations are possible in light of the above teaching. For example, the material of which the components are made does not limit the invention although it may be particularly advantageous, for some applications, to choose the materials such that the alignment is made reasonably stable against changes in temperature. The assembly as disclosed herein has the advantages of simplicity in construction and separation of alignment functions into the three lowest order operations, and has inherent stability. Such modifications and variations which may be apparent to a person skilled in the art are intended to be included within the scope of this invention.

What is claimed is:

1. An apparatus for mounting two lasers to produce controlled parallelism of the beams therefrom comprising a frame having a first wall surface and a second wall surface which are perpendicular to each other, a first plate for affixing a first laser thereon, said first plate being flexibly affixed to said first wall surface along an edge which is normal to said second wall surface, a second plate for affixing a second laser thereon, said second plate being flexibly affixed to said second wall surface along an edge which is normal to said first wall surface, a first adjusting screw adapted to move in the direction normal to said first wall surface and to thereby cause said first laser to move parallel to said second wall surface, and a second adjusting screw adapted to move in the direction normal to said second wall surface and to thereby cause said second laser to move parallel to said first wall surface.

2. The apparatus of claim 1 further comprising a means to reflect a light beam and a beam combining means for combining two beams of light, said reflecting means and said beam combining means being disposed so as to receive beams from said lasers and to produce mutually colinear beams.

3. The apparatus of claim 1 wherein said frame includes three-point mounting means for adjustably orienting said apparatus.

* * * * *